US011422366B2

(12) United States Patent
Knittl et al.

(10) Patent No.: US 11,422,366 B2
(45) Date of Patent: Aug. 23, 2022

(54) MOTOR VEHICLE DISPLAY DEVICE AND MOTOR VEHICLE

(71) Applicant: AUDI AG, Ingolstadt (DE)

(72) Inventors: Thomas Knittl, Ingolstadt (DE); Peter Zeinar, Ingolstadt (DE); Jacques Hélot, Ingolstadt (DE); Alexander Hottinger, Ingolstadt (DE); Xenia Sichwardt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 161 days.

(21) Appl. No.: 16/611,434

(22) PCT Filed: May 7, 2018

(86) PCT No.: PCT/EP2018/061710
§ 371 (c)(1),
(2) Date: Nov. 6, 2019

(87) PCT Pub. No.: WO2018/206499
PCT Pub. Date: Nov. 15, 2018

(65) Prior Publication Data
US 2021/0149191 A1    May 20, 2021

(30) Foreign Application Priority Data
May 9, 2017   (DE) .......................... 102017207799.9

(51) Int. Cl.
*G02B 27/01*   (2006.01)
*G02B 30/52*   (2020.01)

(52) U.S. Cl.
CPC ......... *G02B 27/0101* (2013.01); *G02B 30/52* (2020.01)

(58) Field of Classification Search
CPC .... G02B 27/0101; G02B 30/52; G02B 27/01; G02B 2027/0118; G02B 2027/0185;
(Continued)

(56) References Cited

U.S. PATENT DOCUMENTS 6,525,699 B1 *   2/2003   Suyama ................. G02B 30/54
                                                        345/6
10,017,110 B2 *  7/2018   Aoki ...................... G08G 1/166
(Continued)

FOREIGN PATENT DOCUMENTS

CN   101750747 A   6/2010
CN   102053377 A   5/2011
(Continued)

OTHER PUBLICATIONS

English Translation by WIPO dated Nov. 14, 2019 of the International Preliminary Report on Patentability in corresponding International Patent Application No. PCT/EP2018/061710.
(Continued)

*Primary Examiner* — Jade R Chwasz
(74) *Attorney, Agent, or Firm* — Staas & Halsey LLP

(57) ABSTRACT

At least one display object is displayed by a first display mechanism and a second display mechanism, each having a display surface. At least one of the two display mechanisms is designed such that the display object is produced in a first predetermined sub-region on one of the two display surfaces. The display surfaces are mirror-like, arranged parallel
(Continued)

to each other and facing each other such that a mirror shaft is formed between the display surfaces of the first display mechanism and the second display mechanism, such that the display surfaces reflect each other inside the mirror shaft. The motor vehicle display device is designed to reflect the at least one display object produced in the first predetermined sub-region, after a predefinable number of reflections inside the mirror shaft, in a second predetermined sub-region of the first display mechanism outside the mirror shaft.

14 Claims, 3 Drawing Sheets

(58) Field of Classification Search
CPC .................. H04N 13/395; B60K 35/00; B60K 2370/1529; B60K 2370/334; B60K 2370/167; B60K 2370/785; B60K 2370/349
See application file for complete search history.

(56) References Cited

U.S. PATENT DOCUMENTS

| | | | |
|---|---|---|---|
| 11,132,975 B1 * | 9/2021 | Rodriguez, II | ......... G09G 5/14 |
| 2005/0156813 A1 | 7/2005 | Adachi et al. | |
| 2012/0287125 A1 * | 11/2012 | Liu | ......... G02B 30/40 |
| | | | 345/419 |
| 2013/0265646 A1 * | 10/2013 | Sakai | ..................... G02B 27/01 |
| | | | 359/631 |

FOREIGN PATENT DOCUMENTS

| | | |
|---|---|---|
| DE | 102007018073 A1 | 10/2008 |
| DE | 102007018075 A1 | 10/2008 |
| DE | 102013218099 A1 | 3/2015 |
| DE | 102014019122 A1 | 6/2016 |
| DE | 102017207799.9 | 5/2017 |
| EP | 0 959 377 A2 | 11/1999 |
| WO | 2006/057157 A1 | 6/2006 |
| WO | 2012/045251 A1 | 4/2012 |
| WO | PCT/EP2018/061710 | 5/2018 |

OTHER PUBLICATIONS

Chinese Office Action dated Apr. 20, 2021 from Chinese Application No. 201880045480.X, 6 pp.
International Search Report for PCT/EP2018/061710 dated Aug. 21, 2018.
German Office Action for German Application No. 10 2017 207 799.9 dated Jan. 15, 2018.

* cited by examiner

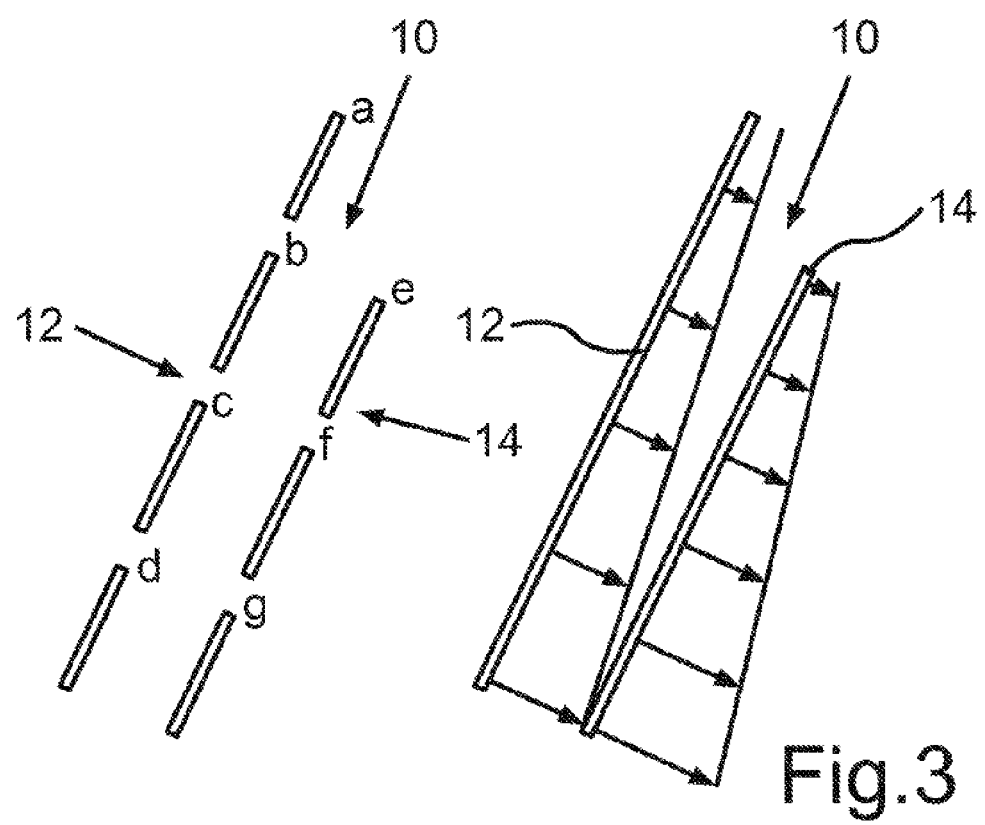

MOTOR VEHICLE DISPLAY DEVICE AND MOTOR VEHICLE

CROSS REFERENCE TO RELATED APPLICATIONS

This application is the U.S. national stage of International Application No. PCT/EP2018/061710, filed May 7, 2018 and claims the benefit thereof. The International Application claims the benefit of German Application No. 10 2017 207 799.9 filed on May 9, 2017, both applications are incorporated by reference herein in their entirety.

BACKGROUND

Described below are a motor vehicle display apparatus and a motor vehicle with such a motor vehicle display apparatus.

The practice of displaying information for a driver and possibly also for a passenger using a display apparatus or using a so-called head-up display in motor vehicles is known. This is because there is a need to display navigation notifications, information from an infotainment system and/or warning notifications in appropriate and easily visible fashion to the respective motor vehicle occupant for the purposes of better orienting the respective motor vehicle occupant and/or for information and entertainment purposes. The respective information is superimposed in the form of a display object on a display area of the display apparatus or of the head-up display in a known manner.

DE 10 2007 018 073 A1 and DE 10 2007 018 075 A1 have each disclosed a method for displaying a digital map in a vehicle and a display device to this end. The display device makes use of a combined arrangement of a display with a planar, semi-transparent mirror in order to make a virtual image disposed upstream of the display device appear for an observer of the display device.

DE 10 2014 019 122 A1 has disclosed a display system and a motor vehicle with a display system, in which a first object and a second object are displayed in two successively disposed virtual image planes by a display device under agency of a mirror arrangement.

However, the known display apparatuses provided for a motor vehicle do not allow the display of more than two virtual display planes in the motor vehicle for a motor vehicle occupant, or only allow this with the aid of further mirror arrangements. As a result, a depth effect or 3D effect, which should arise for the motor vehicle occupant when observing the display apparatus with the superimposed display objects, is limited.

SUMMARY

Described below is a generic motor vehicle display apparatus in which a representation of information, that is as realistic as possible, is provided in the motor vehicle.

The display apparatus is based on the discovery that a presentation of various display objects on a display surface of a motor vehicle display apparatus is perceived as being particularly realistic if a display of the various display objects is distributed among various virtual display planes. The various virtual display planes each have a different virtual distance from the display surface such that the effect of the display objects presented on the virtual display planes being disposed in succession and/or having different distances from the eye of an observer emerges for the observer of the display surface.

The display apparatus is furthermore based on the discovery that a multiplicity of virtual display planes arise parallel to the display surfaces as a result of two reflecting display surfaces that are disposed in parallel. The motor vehicle display apparatus thus has two display devices, each with a display surface, wherein at least one of the two display devices is configured to generate the at least one display object in a first predetermined portion on the respective display surface. Thus, the two display devices can be already known monitors or displays which, for example by an illuminant, superimpose a predetermined luminous image of the display object in a predetermined region on the display surface. That region of the display surface on which the display object is generated for the first time by the display device and the display object is superimposed as a consequence is referred to as the first predetermined portion below.

Accordingly, the two display devices also have a reflective property in addition to the capability of generating the at least one display object and superimposing the latter on the display surface. To this end, the respective display surfaces are embodied as reflecting display surfaces. Here, the respective display surfaces of the two display devices are disposed parallel to one another and face one another in such a way that the display surfaces reflect one another. Thus, the display surfaces of the first display device are reflected in the display surface of the second display device, and vice versa. A first virtual image, which arises by a reflection of the display surface of the first display device in the display surface of the second display device, then is reflected, in turn, on the display surface of the first display device. Consequently, a multiplicity of virtual display planes arise after a multiplicity of such reflections, the display planes forming parallel to the two display surfaces and each presenting an image of one of the two display surfaces.

The two parallel display surfaces facing one another consequently form a mirror shaft such that the at least one display object generated in the first predetermined portion on one of the two display surfaces is subject to a predeterminable number of reflections within the mirror shaft. Thus, a type of cavity is formed between the two parallel display surfaces, with two opposite sides, which delimit this cavity, being provided by the reflecting display surfaces. This cavity, which forms the mirror shaft, can extend along a longitudinal direction of the two display surfaces. Consequently, the mirror shaft can have the same length as a length of at least one of the two display surfaces. Likewise, a width of the mirror shaft can correspond to a width of at least one of the two display surfaces. With the exception of the two reflecting, parallel display surfaces, the mirror shaft can be open and/or at least one further area can delimit the mirror shaft. The further area can be embodied as a light-absorbing area in order to avoid unwanted further reflections within the mirror shaft. However, the further area can also be embodied as a reflecting area in order to assist a desired reflection within the mirror shaft.

Accordingly, at least one second predetermined portion of the display surface of the first display device is disposed outside of the mirror shaft. By way of example, the display surface of the first display device is longer than the display surface of the second display device in the longitudinal direction. Consequently, the mirror shaft can be formed exclusively along portions of the two display surfaces that overlap in a plane parallel to the two display surfaces. Consequently, the second predetermined portion can be designed as a type of extension of the display surface of the first display device in the longitudinal direction of the mirror shaft. Consequently, the second predetermined portion denotes a region on the display surface of the first display device that is situated outside of the mirror shaft such that this second predetermined portion is set.

The motor vehicle display apparatus is configured to reflect the at least one display object generated in the first predetermined portion into the second predetermined portion of the first display device after a predeterminable number of reflections within the mirror shaft. Here, it is irrelevant whether the first predetermined portion, on which the display object is generated, is situated on the first display device or on the second display device. In particular, the motor vehicle display apparatus can be configured in such a way that the predeterminable number of reflections is at least three. Thus, a light beam emanating from the at least one display object is reflected back and forth between the two display surfaces within the mirror shaft, proceeding from the first predetermined portion, until the light beam reaches into the second predetermined portion. In particular, the light beam can be reflected back and forth at least three times. As a result of the reflection in the mirror shaft, the at least one display object is visible in the second predetermined portion. To this end, the at least one display object is displayed on at least one virtual display plane, wherein the at least one virtual display plane is formed behind the second predetermined portion of the first display device in a visual region thereof. Thus, the at least one virtual display plane faces away from the display surface of the first display device. The virtual display plane can have a predetermined angle of intersection with the display surface of the first display device. An observer directing their viewing angle on the second predetermined portion can consequently perceive the at least one display object with a depth effect relative to the first display surface. Here, the display plane, on which at least one display object is imaged, can have a predetermined virtual distance from the display surface of the first display device when viewed from the certain viewing angle, wherein the predetermined distance depends on the number of reflections of the display object within the mirror shaft. The virtual distance of the at least one display object visible in the second predetermined portion from this second predetermined portion can consequently be correlated to a distance that the light beam has to traverse proceeding from the first predetermined portion to reach into the second predetermined portion. By way of example, the virtual distance increases with increasing length of the distance traveled by the light beam.

The two display devices can each generate a plurality of display objects in different regions on the respective display surface. Thus, in this case, each of these display objects has a different first predetermined portion. Thus, a different light beam emanates from each of these display objects, the light beam traversing a different path length in order to be reflected into the second predetermined portion. Depending on the path length, a different depth of the respective display object thus arises when the second portion is observed. Expressed differently, the virtual image of the display objects has a different virtual distance from the second predetermined portion of the first display device, depending on the length of the path traveled by the light beam emanating from the respective display object. Therefore, a multiplicity of virtual display planes arise, which are disposed parallel in succession, facing away from the display surface of the first display device. As a result of this, the effect arises that the different display objects appear to have a different distance from the second predetermined portion. Thus, if a motor vehicle occupant looks at the motor vehicle display apparatus, different information items, e.g., in the form of a navigation arrow and/or a speedometer and/or a number and/or a symbol and/or a sequence of letters, are presented to them in such a way in the second portion of the first display device that a spatial depth effect arises for the observer. The advantage of the display being perceived as particularly realistic arises as a result thereof.

Further, a particularly compact apparatus arises from the design of the motor vehicle display apparatus which requires little space when installed in a motor vehicle. The space-saving motor vehicle display apparatus arises, firstly, from the fact that the two display devices of the motor vehicle display apparatus carry out a dual function, specifically they produce and reflect the display object such that no further mirror and/or no further image generating apparatus is required. Secondly, the space-saving motor vehicle display apparatus arises from the parallel alignment of the two display devices. A distance between the two display surfaces can be kept small without changing the reflection and depth effect in the second predetermined portion of the first display device. Thus, the motor vehicle display apparatus can be kept compact, at least in the direction of a normal vector with respect to the display surfaces. The advantage of providing a particularly cost-effective and construction material-saving display apparatus for a motor vehicle additionally arises due to the compact motor vehicle display apparatus.

An advantageous development of the motor vehicle display apparatus provides for the distance of the virtual display plane, on which the at least one display object is displayed, from the display surface of the first display device to be adjustable as a function of a position of the first predetermined portion of the at least one display object on the respective display surface. Expressed differently, a position of one or more display objects on the display surface of the first and/or second display device can be chosen in such a way that a predetermined virtual distance arises between the respective virtual image of the respective display object and the second predetermined portion of the first display device. Consequently, the motor vehicle display apparatus can be configured to control what display object should be displayed in the foreground, what display object should be displayed in the background. By way of example, information classified as important is presented by a first display object, which is displayed in the foreground in the second predetermined portion. The first predetermined portion of this first display object is relatively close to the second predetermined portion such that the light emanating from this first display object must travel a relatively short distance to the second predetermined portion. In contrast thereto, information classified as less important is presented by a second display object, which is displayed in the background, i.e., behind the first display object, in the second predetermined portion. To this end, the distance of the first predetermined portion of the second display object from the second predetermined portion is greater than the distance of the first predetermined portion of the first display object from the second predetermined portion.

The sequence of the displayed display objects in the second predetermined portion can be modifiable. To this end, the two display devices are able to superimpose the respective display objects at different positions on the display surfaces, as required, and to interchange the positions among themselves. By way of example, a speed measurement of the motor vehicle is presented by the first display object; this is initially visible to the driver in the foreground in the second predetermined portion. A second display object thereupon represents a warning notification, which was subsequently generated. If the information of the warning notification is classified as being more important than the information about the speed of the motor vehicle, the motor vehicle display apparatus is configured to choose a position of the superimposition of the warning notification on one of the two display surfaces in such a way that the path length of the light emanating from the warning notification to the second predetermined portion in the first predetermined portion is shorter than that path length of the speed measurement in the first predetermined portion.

By way of example, the motor vehicle display apparatus can also be used to generate a three-dimensional image by the various virtual display planes. To this end, a display object can extend over an overall area of one of the two display surfaces. Different regions of the display object appear to have different distances in the second predetermined portion. The advantage of promoting an intuitive control of the motor vehicle display apparatus arises as a result thereof.

A further advantageous embodiment provides for the motor vehicle display apparatus to include light shielding. The light shielding extends along at least one area adjoining the two display surfaces in such a way that the mirror shaft is at least partly shielded by the light shielding against light incident from outside of the mirror shaft. The light shielding may also completely shield the mirror shaft from the light incident from outside of the mirror shaft. The light shielding can form at least one bounding wall of the cavity. Expressed differently, the light shielding can represent at least one further side of the mirror shaft, which, for example, is not provided by the parallel display surfaces of the two display devices. By way of example, the mirror shaft can be cuboid, wherein two opposite, parallel sides of the cuboid are each provided by a display surface. Then, at least one further side of the mirror shaft can be provided by the light shielding. The light shielding can also be configured in such a way that all sides of the mirror shaft that are not formed by the display surfaces are closed by the light shielding. By way of example, the light shielding is configured as a light-absorbing covering part that extends over the one further side of the mirror shaft. The covering part may be formed from plastic or a cloth material. The light shielding can be configured in such a way that it completely surrounds the two display devices with the exception of the second predetermined portion of the first display device. The light shielding yields the advantage that the reflections of the at least one display object within the mirror shaft are not influenced by external light not generated by the at least one display object itself. Also, the light shielding can prevent further unwanted reflections arising in the mirror shaft. This can guarantee the reflection effect in the second predetermined portion.

In a further advantageous development, the motor vehicle display apparatus includes a deflection element. The deflection element faces the second predetermined portion of the first display device in such a way that the at least one display object reflected into the second predetermined portion is reflected toward the deflection element. The deflection element is furthermore configured to deflect the at least one display object reflected on the deflection element in such a way that the at least one display object is displayed on at least one virtual display plane, wherein the at least one virtual display plane forms a predetermined angle of intersection with respect to a plane parallel to the display surfaces. Expressed differently, the second predetermined portion of the first display device reflects in the deflection element. By way of example, the deflection element can be embodied as a pane or a glass and/or, for example, can have a predetermined refractive index. Thus, the deflection element is embodied to deflect or divert the light beams that are incident in the second predetermined portion and reflected at the second predetermined portion. The predetermined angle of intersection can be chosen in such a way that the virtual display planes, which arise behind the display surface of the first display device, now arise behind the deflection element. An observer of the deflection element, who directs their viewing angle on a front side of the deflection element, for example, now perceives a sequence of successively disposed virtual display planes behind the front side of the deflection element.

The deflection element can be disposed above the two display surfaces when observed in the longitudinal direction of the mirror shaft. The light beam emanating from the at least one display object is then reflected along the mirror shaft from a lower region upward in the direction of the deflection element, wherein an upper end of the display surface of the first display device forms the second predetermined portion. The deflection element can be just as wide as at least one of the two display surfaces. The deflection of the virtual display planes yields the advantage that a relative distance of the individual display planes from one another can be increased and/or distorted such that the individual display objects on the various display planes can be clearly staggered with respect to one another. This can amplify the depth effect of the individual display object arising from the different distances. The deflection element yields the advantage that the various display planes become perceivable in a viewing angle that is easier to accept by the driver, for example. By way of example, the deflection element forms a windshield of a motor vehicle, at least in certain areas. The virtual display planes are then displayed behind the windshield. Then, the driver can see the virtual display planes behind the windshield when observing the windshield and need not deflect their gaze from the windshield.

A further embodiment of the motor vehicle display apparatus provides for at least one of the two display devices to be configured to vary a brightness of the at least one generated display object as a function of a position of the first predetermined portion. Expressed differently, at least one of the two display devices can modify the brightness of the display object to be superimposed depending on the position at which the at least one display object should be superimposed. The brightness of the at least one generated display object can be correlated with a distance of the first predetermined portion from the second predetermined portion. By way of example, the display object is superimposed with increased brightness in the first predetermined portion, the greater the distance of the first predetermined portion is from the second predetermined region. Thus, a respective brightness of the respective display device can vary along a longitudinal direction of at least one of the two display surfaces. This yields the advantage that a darkening effect that occurs with increasing number of reflections of the at least one display object is counteracted. This is because light is lost at each reflection of the display object in the respective opposite display surface, and so the display object appears successively darker in the higher orders of reflection. The more frequently the display object has to be reflected in order to be reflected into the second predetermined portion, the smaller and darker it is displayed in the virtual display plane in the second predetermined portion. The brightness can vary on the at least one display surface in such a way that the brightness of the object displayed in the second predetermined portion remains unchanged, independently of the virtual display plane. Consequently, this allows a multiplicity of virtual display planes to be visible in the second portion, in particular at least three virtual display planes and/or in particular at least four virtual display planes.

A further advantageous embodiment provides for the display surface of at least one of the two display devices to have different levels of reflectance along a longitudinal direction of the respective display device. Expressed differently, at least one of the two display surfaces has different reflection properties along its longitudinal direction. A different proportion of the light is reflected at the respective point on the display surface of one of the two display devices as a result of the different levels of reflectance. To this end, at least one of the two display devices can have at least two or more display surfaces, which each have different levels of reflectance. The at least two or more display surfaces can adjoin one another such that they form a uniform display surface overall. Expressed differently, the display surface of at least one display device can be divided into a plurality of portions, with the portions each having a different level of reflectance. The greater the level of reflectance of a portion can be, the further away the portion of the display device is from the second predetermined portion of the first display device. By way of example, different levels of reflectance can be facilitated by different reflection films, which are applied to the display surface. The fact that different regions of the display surface are able to reflect to a different extent yields the advantage that a luminous intensity of a display object, which is generated in a region further away from the second portion and which hence must be reflected more often in the mirror shaft, is maintained relatively well as a result of the high level of reflectance in order to be displayed in the second portion. Then, the display objects on the back virtual display planes visible in the second portion can appear just as bright as display objects on the front display planes. Thus, the different levels of reflectance of a display surface can compensate a loss of luminous intensity by the multiplicity of reflections in the mirror shaft.

The motor vehicle includes the described motor vehicle display apparatus. The motor vehicle display apparatus may be disposed in a pane root of the motor vehicle, i.e. the region where a windshield adjoins an instrument panel of the motor vehicle.

The two display devices of the motor vehicle display apparatus may be at least partly covered by the instrument panel. It is possible here that only the second predetermined portion of the display surface of the first display device extends out of the instrument panel. The remaining region of the display surface of the first display device can then be received by a cutout in the instrument panel. Likewise, a further cutout in the instrument panel can receive the second display device. Here, the second display device may be received entirely within the instrument panel. Consequently, the instrument panel can form the light shielding of the motor vehicle display apparatus.

The deflection element may be embodied as at least one portion of a windshield of the motor vehicle. Expressed differently, the second predetermined portion of the first display device, which is disposed outside of the instrument panel, is reflected in the windshield. The latter deflects the virtual display planes displayed in the second predetermined portion into the windshield. When observed from an interior of the motor vehicle, the virtual display planes are disposed behind the windshield.

The respective display surface of the two display devices may extend from a driver's seat region to a front passenger's seat region in the vehicle transverse direction. The two display surfaces can extend over an entire width of the windshield. This yields a particularly large, three-dimensional information area for displaying the at least one display object in the motor vehicle.

The advantages and developments described above in conjunction with the motor vehicle display apparatus apply analogously to the motor vehicle. For this reason, the corresponding developments of the motor vehicle display apparatus are not described once again here.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 3 is a schematic side view of two embodiments of the motor vehicle display apparatus, only presented in part in each case.

DETAILED DESCRIPTION OF THE PREFERRED EMBODIMENT

Figure 1A:
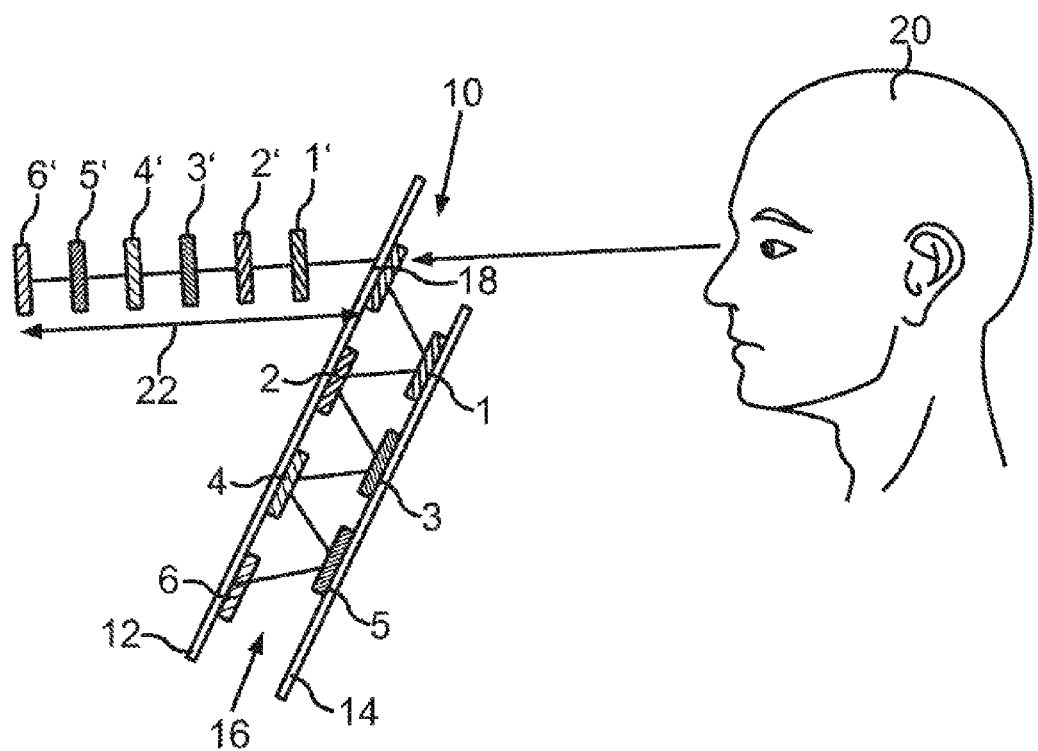
FIG. 1a is a schematic side view of a motor vehicle display apparatus, only presented in part, for displaying at least one display object on at least one of a multiplicity of virtual display planes.

Reference will now be made in detail to the preferred embodiments, examples of which are illustrated in the accompanying drawings, wherein like reference numerals refer to like elements throughout.

In the exemplary embodiments, the described components of the embodiments each represent individual features that should be considered independently of one another, the features respectively also developed independently of one another and the features are therefore also intended to be considered to be a constituent part individually or in a different combination than the combination shown. Moreover, the described embodiments can also be complemented by further features already described.

In the figures, functionally equivalent elements are provided with the same reference sign in each case.

FIG. 1a only partly illustrates a schematic side view of a motor vehicle display apparatus 10. The motor vehicle display apparatus 10 is configured to display at least one display object on at least one of a multiplicity of virtual display planes 1', 2', 3', 4', 5', 6'. To this end, the motor vehicle display apparatus 10 has a first display device and a second display device, each having a display surface 12, 14.

FIG. 1a only illustrates the display surfaces 12, 14 of the first and the second display device in a side view. The two display devices can each be embodied as a flat monitor. By way of example, at least one of the two display devices is embodied as a so-called OLED display. The two display surfaces 12, 14 are disposed parallel to one another and face one another such that at least one portion of the one display surface 12, 14 is reflected in the respective other display surface 14, 12. In this example, a length of the display surface 14 of the second display device is shorter than a length of the display surface 12 of the first display device. A mirror shaft 16 is formed between the two display surfaces 12, 14, the mirror shaft 16 having the length of the shorter display surface 14. The mirror shaft 16 can be just as wide as at least one of the two display surfaces 12, 14. A breadth of the mirror shaft 16 emerges from a distance between the two display surfaces 12, 14. This can be kept low, and so the motor vehicle display apparatus 10 can have a small breadth overall.

Different display objects are generated by the respective display device and superimposed on the respective display surface 12, 14 at different points 1, 2, 3, 4, 5, 6 on the respective display surface 12, 14. These points 1, 2, 3, 4, 5, 6 are referred to as first predetermined portions 1, 2, 3, 4, 5, 6 below. Proceeding from the superimposed display object, a light beam from the first predetermined portion 1, 2, 3, 4, 5, 6 is reflected back and forth between the two display surfaces 12, 14. Consequently, the display object is reflected in the respective opposite display surface 12, 14.

Thus, the first display device has a longer display surface 12 than the display surface 14 of the second display device. A portion of the display surface of the first display device is consequently disposed outside of the mirror shaft 16. Below, this portion is referred to as the second predetermined portion 18.

A part of the light beam from each superimposed display object reaches into the second predetermined portion 18. In the second predetermined portion 18, the at least one display object is presented on a virtual display plane 1', 2', 3', 4', 5', 6'. To an observer 20 of the motor vehicle display apparatus 10, who directs their view on the second predetermined portion 18, the at least one display object on a virtual display plane 1', 2', 3', 4', 5', 6' appears behind the second predetermined portion 18. A virtual distance 22 between the virtual display planes 1', 2', 3', 4', 5', 6' and the second predetermined portion 18 of the display surface appears shorter or longer depending on the length of the path that the light had to travel from the first predetermined portion 1, 2, 3, 4, 5, 6 to the second predetermined portion 18. A length of the path traveled by the light from the first predetermined portion 1, 2, 3, 4, 5, 6 to the second predetermined portion 18 equals the distance 22 between the second predetermined portion 18 and the respective virtual display plane 1', 2', 3', 4', 5', 6'. Thus, the longer the mirror shaft 16, the more often a display object is reflected between the two display surfaces 12 and 14, and the greater the virtual distance 22 appears in the second predetermined portion 18.

The display objects presented in a total of six different first predetermined portions 1, 2, 3, 4, 5, 6 in FIG. 1a appear on six successively disposed virtual display planes 1', 2', 3', 4', 5', 6' behind the second predetermined portion 18 in the viewing angle of the observer 20. Here, the display object superimposed in 1 has been reflected a total of one time in order to be presented on the virtual display plane 1'. Analogously, the display object superimposed in 2 has been reflected twice in order to be presented on the virtual display plane 2'. The more often the superimposed display object has to be reflected overall in order to be presented on one of the virtual display planes 1', 2', 3', 4', 5', 6', the smaller and darker it appears in the second predetermined portion 18. In order to counteract this effect, the display surfaces 12, 14 can be configured to superimpose a display object ever more brightly the further away the display object should be superimposed from the second predetermined portion 18. Furthermore, the display surfaces 12, 14 can each have different levels of reflectance in certain areas in order to counteract this effect. Then, a display surface 12, 14 can have a higher level of reflectance in a region thereof situated further away from the second predetermined portion 18. From the view of the observer 20, the different display objects are presented in distributed fashion on a plurality of display planes 1', 2', 3', 4', 5', 6' in succession, wherein the display objects appear unchangingly bright or only slightly darker with increasing distance 22.

Figure 1B:
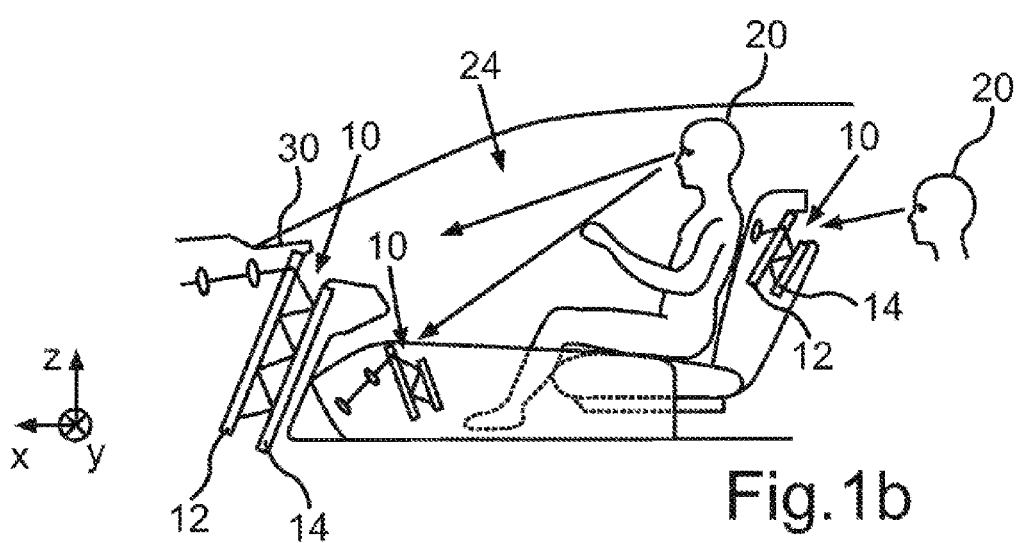
FIG. 1b shows a schematic side view of a motor vehicle, only presented in part, with three exemplary embodiments of the motor vehicle display apparatus in the motor vehicle.

FIG. 1b presents different examples of possible installation options for the motor vehicle display apparatus 10 in a motor vehicle 24. To this end, FIG. 1b shows a schematic side view of a motor vehicle 24, only presented in part, with three exemplary embodiments of the motor vehicle display apparatus 10 in the motor vehicle 24. The motor vehicle display apparatus 10 can be installed in a pane root 30 of the motor vehicle 24 such that an observer 20 can perceive the virtual display planes 1', 2', 3', 4', 5', 6' in the second predetermined portion 18, the observer being seated in a driver's seat of the motor vehicle 24 and directing their viewing angle on an instrument panel 28 and/or a windshield 32. Additionally or alternatively, a motor vehicle display apparatus 10 can be disposed in a center console of the motor vehicle 24. Furthermore, a further motor vehicle display apparatus 10 can be disposed in a driver's seat and/or in a front passenger's seat of the motor vehicle 24 such that an observer 20 seated on a rear bench of the motor vehicle 24 can perceive the virtual display planes 1', 2', 3', 4', 5', 6' in the second predetermined portion 18 of the motor vehicle display apparatus 10.

Figure 1C:
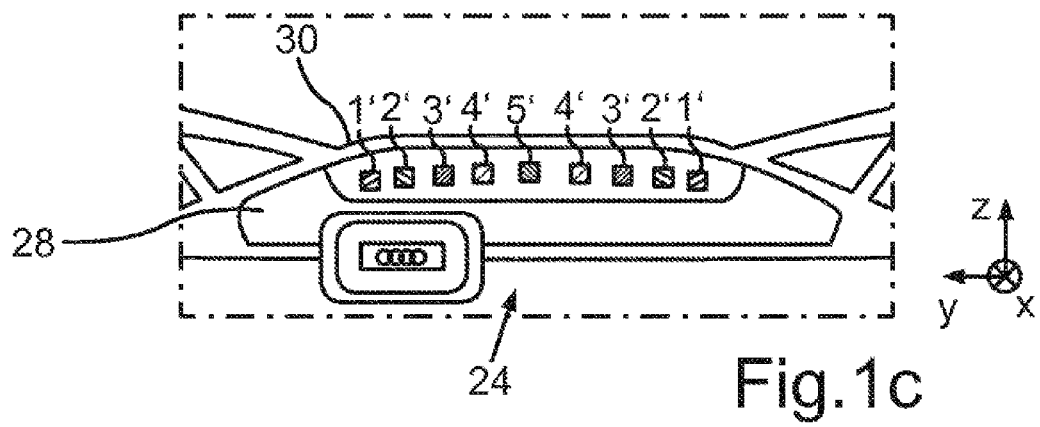
FIG. 1c is a schematic illustration of a front view of a motor vehicle interior, only presented in part, with an instrument panel in which the motor vehicle display apparatus is received at least in part, and of the multiplicity of virtual display planes.

FIG. 1c provides an example of what an observer could see in the case where the motor vehicle display apparatus 10 is disposed in the instrument panel 28. To this end, FIG. 1c shows a schematic illustration of a front view of an interior of the motor vehicle 24, only presented in part, with an instrument panel 28, within which the motor vehicle display apparatus 10 is received at least in part. Furthermore, FIG. 1c shows the multiplicity of virtual display planes 1', 2', 3', 4', 5', which arise by the reflections in the two display surfaces 12, 14. The motor vehicle display apparatus 10 can be almost completely masked by the instrument panel 28 and only the second predetermined portion 18 may protrude from the instrument panel 28 and/or be visible. In the illustrated example, the display plane 5' appears furthest away to the observer 20 of the second predetermined portion 18 of the motor vehicle display apparatus 10 and the display plane 1' appears closest to them.

Figure 2A:
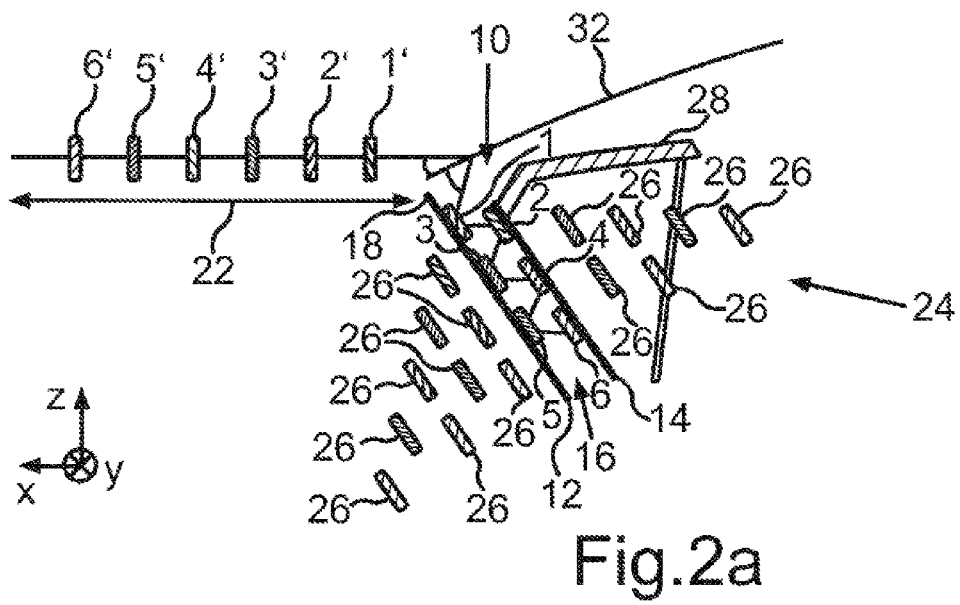
FIG. 2a is a schematic side view of the motor vehicle display apparatus, only presented in part, which is disposed in a motor vehicle only presented here in terms of a section and of the multiplicity of virtual display planes.

FIG. 2a provides a further embodiment of the motor vehicle display apparatus 10 in a motor vehicle 24. To this end, FIG. 2a shows the motor vehicle display apparatus 10 in the same side view, and likewise illustrated only in part, as in FIG. 1a. Furthermore, FIG. 2a shows a multiplicity of virtual images 26, which arise from reflecting the first predetermined portion in the two display surfaces 12, 14. The second display device is completely disposed below an instrument panel 28 such that the second display device is invisible from a passenger compartment of the motor vehicle 24. In the vehicle longitudinal direction x, the display surface 14 of the second display device is situated closer to the passenger compartment than the display surface 12 of the first display device. The second predetermined portion 18 of the display surface 12 of the first display device protrudes from the instrument panel 28, while the remaining region of this display surface 12 is likewise received within the instrument panel 28. As a result of this, the majority of the mirror shaft 16 is protected by light incident from outside of the mirror shaft 16. The second predetermined portion 18 is situated in a pane root 30 of the motor vehicle 24, i.e., in that region of the instrument panel 28 where a windshield 32 of the motor vehicle 24 adjoins. The windshield 32 serves as a deflection element 32 of the motor vehicle display apparatus 10. The light of the virtual images 26 of the various display objects, which is reflected to the second predetermined portion 18, strikes a surface of the windshield 32 in the interior of the motor vehicle 24. Thereupon, this light is deflected by the windshield 32 such that the virtual images of the display objects are displayed on a multiplicity of virtual display planes 1', 2', 3', 4', 5', 6' behind the windshield 32 in the vehicle longitudinal direction x. Consequently, information can be displayed for a driver or a front seat passenger of the motor vehicle 24, directly on the windshield 32 by the display objects in a viewing angle directed to the windshield 32.

Figure 2B:
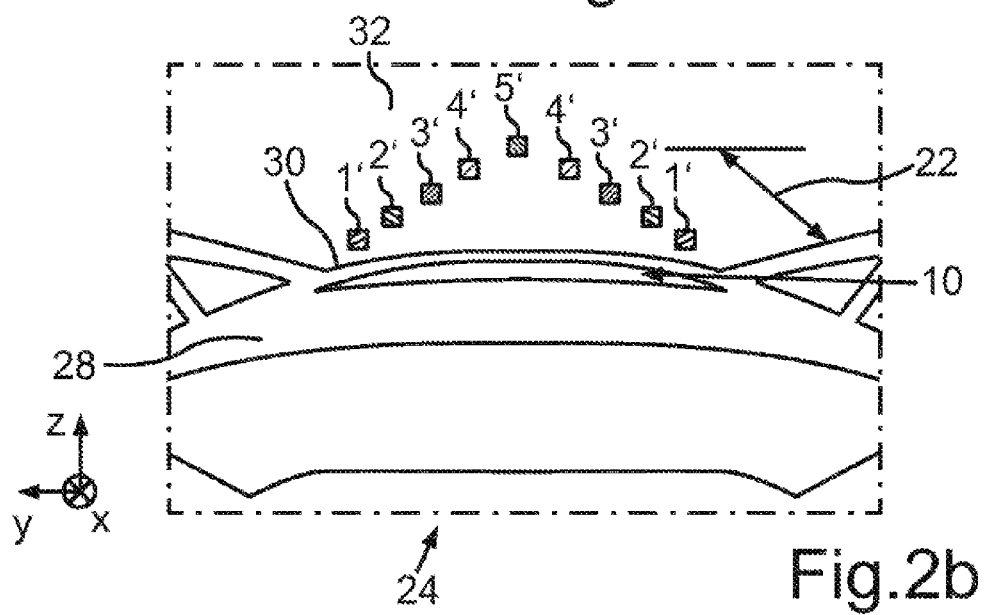
FIG. 2b is a schematic illustration of a front view of a motor vehicle interior, only presented in part, with an instrument panel in which the motor vehicle display apparatus is received at least in part, and of, illustrated in a windshield, the multiplicity of virtual display planes.

A possible view from a perspective of a driver or a front seat passenger within the motor vehicle 24 is illustrated schematically in FIG. 2b. Only the second predetermined portion 18 of the display surface 12 of the first display device protrudes from the instrument panel 28. The second predetermined portion can be disposed as close as possible to the pane root 30. A multiplicity of virtual display objects are displayed on the windshield 32, with these display objects having mutually different distances 22 from the windshield 32. Here, a total of five display planes 1', 2', 3', 4', 5' are illustrated, with two display objects being able to be presented on the four front display planes 1', 2', 3', 4' in each case. The display plane 5' appears to be at the greatest distance for the observer 20 of the windshield 32; the display plane 1' appears closest to them. A particularly realistic presentation of the display objects in the three-dimensional space arises due to the multiplicity of display planes 1', 2', 3', 4', 5'.

FIG. 3 shows a schematic side view of two embodiments of the motor vehicle display apparatus 10, merely presented in part in both cases. As illustrated on the left-hand side of FIG. 3, the two display surfaces 12 and 14 can each be divided up. Expressed differently, a display surface 12, 14 is composed of a plurality of pieces a, b, c, d, e, f, g. By way of example, the pieces a, b, c, d, e, f, g, among one another, are separated from one another in space by a gap in each case. If the display surfaces 12 and 14 are formed as a display in each case, a display surface 12, 14 is composed of a plurality of displays a, b, c, d, e, f, g in each case. The displays a, b, c, d, e, f, g can have different reflective properties and/or different brightnesses. By way of example, the displays d and g are brightest and the displays a and c are darkest among all the brightnesses of the displays a, b, c, d, e, f, g. Expressed differently, the brightness of the respective display increases ever more in the direction of the displays a, b, c and d. In the same way, the brightness of the displays e, f and g can also increase in each case. This compensates a loss of brightness by the ever-increasing number of reflections in the direction of the second predetermined portion 18.

The two display surfaces 12 and 14 of the motor vehicle display apparatus 10 are illustrated in a side view on the right-hand side of FIG. 3. The display surfaces 12, 14 each have an integral embodiment, for example as a single display in each case. The illustrated arrows each represent an intensity of the brightness and/or a luminous intensity of the respective display surface 12, 14, with a longer arrow meaning a greater brightness and/or luminous intensity. For each display surface 12, 14, the brightness of the display surface 12, 14 increases in linear fashion along the longitudinal direction of the respective display surface 12, 14. This, too, can compensate a loss of brightness by the ever-increasing number of reflections in the direction of the second predetermined portion 18.

Overall, the examples show how to provide a motor vehicle display apparatus that displays information and content in particularly realistic and user-friendly fashion for a motor vehicle occupant.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A motor vehicle display apparatus for displaying at least one display object, comprising:
   first and second display devices with respective display surfaces parallel to and facing each other,
   at least one of the first and second display devices being configured to generate the at least one display object in a first predetermined portion on the respective display surface,
   the respective display surfaces being reflecting display surfaces, each having a single display, forming a mirror shaft therebetween such that the respective display surfaces of the first display device and the second display device reflect one another within the mirror shaft, the respective display surface of at least one of the first and second display devices having different levels of reflectance along a longitudinal direction of the respective display surface, independent of any display object generated,
   at least a second predetermined portion of the respective display surface of the first display device being disposed outside of the mirror shaft, the at least one display object generated in the first predetermined portion being reflected into the second predetermined portion of the first display device after a predeterminable number of reflections within the mirror shaft,
   at least one of the first and second display devices being configured to modify a brightness of the display object to be superimposed in a manner depending on a position at which the at least one display object is superimposed, and
   at least one of the first and second display devices being configured to vary a respective brightness along a longitudinal direction and to superimpose the display object in ever-brighter fashion in the first predetermined portion as a first distance of the first predetermined portion from the second predetermined portion increases.

2. The motor vehicle display apparatus as claimed in claim 1, wherein a second distance of a virtual display plane, on which the at least one display object is displayed, from the respective display surface of the first display device is adjustable as a function of a position of the first predetermined portion of the at least one display object on the respective display surface.

3. The motor vehicle display apparatus as claimed in claim 2, further comprising light shielding extending along at least one area adjoining the first and second display surfaces such that the mirror shaft is at least partly shielded by the light shielding against light incident from outside of the mirror shaft.

4. The motor vehicle display apparatus as claimed in claim 3, further comprising a deflection element facing the second predetermined portion of the first display device such that the at least one display object reflected into the second predetermined portion is reflected toward the deflection element, the deflection element being configured to deflect the at least one display object reflected on the deflection element onto at least one virtual display plane forming a predetermined angle of intersection with respect to a plane parallel to the display surfaces.

5. The motor vehicle display apparatus as claimed in claim 1, further comprising light shielding extending along at least one area adjoining the first and second display surfaces such that the mirror shaft is at least partly shielded by the light shielding against light incident from outside of the mirror shaft.

6. The motor vehicle display apparatus as claimed in claim 1, further comprising a deflection element facing the second predetermined portion of the first display device such that the at least one display object reflected into the second predetermined portion is reflected toward the deflection element, the deflection element being configured to deflect the at least one display object reflected on the deflection element onto at least one virtual display plane forming a predetermined angle of intersection with respect to a plane parallel to the display surfaces.

7. A motor vehicle comprising:
a motor vehicle display apparatus having first and second display devices with respective display surfaces parallel to and facing each other,
at least one of the first and second display devices being configured to generate at least one display object in a first predetermined portion on the respective display surface,
the respective display surfaces being reflecting display surfaces, each having a single display, forming a mirror shaft therebetween such that the respective display surfaces of the first display device and the second display device reflect one another within the mirror shaft, the respective display surface of at least one of the first and second display devices having different levels of reflectance along a longitudinal direction of the respective display surface, independent of any display object generated,
at least a second predetermined portion of the respective display surface of the first display device being disposed outside of the mirror shaft, the at least one display object generated in the first predetermined portion being reflected into the second predetermined portion of the first display device after a predeterminable number of reflections within the mirror shaft,
at least one of the first and second display devices being configured to modify a brightness of the display object to be superimposed in a manner depending on a position at which the at least one display object is superimposed, and
at least one of the first and second display devices being configured to vary a respective brightness along a longitudinal direction and to superimpose the display object in ever-brighter fashion in the first predetermined portion as a first distance of the first predetermined portion from the second predetermined portion increases.

8. The motor vehicle as claimed in claim 7, wherein a second distance of a virtual display plane, on which the at least one display object is displayed, from the respective display surface of the first display device is adjustable as a function of a position of the first predetermined portion of the at least one display object on the respective display surface.

9. The motor vehicle as claimed in claim 8, further comprising light shielding provided at least in part by at least one portion of an instrument panel of the motor vehicle, the light shielding extending along at least one area adjoining the first and second display surfaces such that the mirror shaft is at least partly shielded by the light shielding against light incident from outside of the mirror shaft.

10. The motor vehicle as claimed in claim 9, further comprising a windshield having at least one portion forming a deflection element facing the second predetermined portion of the first display device such that the at least one display object reflected into the second predetermined portion is reflected toward the deflection element, the deflection element being configured to deflect the at least one display object reflected on the deflection element onto at least one virtual display plane forming a predetermined angle of intersection with respect to a plane parallel to the display surfaces.

11. The motor vehicle as claimed in claim 7,
further comprising a driver's seat region and a front passenger's seat region, and
wherein the respective display surface of the first and second display devices extends from the driver's seat region to the front passenger's seat region in a vehicle transverse direction.

12. The motor vehicle as claimed in claim 7, further comprising light shielding provided at least in part by at least one portion of an instrument panel of the motor vehicle, the light shielding extending along at least one area adjoining the first and second display surfaces such that the mirror shaft is at least partly shielded by the light shielding against light incident from outside of the mirror shaft.

13. The motor vehicle as claimed in claim 7, further comprising a windshield having at least one portion forming a deflection element facing the second predetermined portion of the first display device such that the at least one display object reflected into the second predetermined portion is reflected toward the deflection element, the deflection element being configured to deflect the at least one display object reflected on the deflection element onto at least one virtual display plane forming a predetermined angle of intersection with respect to a plane parallel to the display surfaces.

14. The motor vehicle as claimed in claim 7,
further comprising a driver's seat region and a front passenger's seat region, and
wherein the respective display surface of the first and second display devices extends from the driver's seat region to the front passenger's seat region in a vehicle transverse direction.

* * * * *